United States Patent [19]

Clark

[11] Patent Number: 5,848,294
[45] Date of Patent: Dec. 8, 1998

[54] PCI COMPUTER SYSTEM WITH MULTIPLE LEGACY DEVICES

[75] Inventor: Richard L. Clark, Seattle, Wash.

[73] Assignee: ETMA, Inc., Redmond, Wash.

[21] Appl. No.: 730,881

[22] Filed: Oct. 17, 1996

[51] Int. Cl.$^6$ .................................................. G06F 13/364
[52] U.S. Cl. ...................... 395/856; 395/830; 395/800.01
[58] Field of Search ..................................... 395/856, 830, 395/822, 800.01, 800.32

[56] References Cited

U.S. PATENT DOCUMENTS 4,787,085  11/1988  Suto et al. .......................... 370/110.1

OTHER PUBLICATIONS

PCI Special Interset Group, *PCI Local Bus, Revision 2.1*, Chapter 1 "Introduction " and pp. 187–198, Jun. 1, 1995.

*Primary Examiner*—Eric Coleman
*Assistant Examiner*—Mackly Monestime
*Attorney, Agent, or Firm*—Stoel Rives LLP

[57] ABSTRACT

The novel computer system (10) includes a host computer CPU (12), a first VGA graphics chip (14) associated with a first monitor (16), a second VGA graphics chip (18) associated with a second monitor (20) and a chip manager application running on the host computer CPU (12). The chips (14 and 18) are interconnected to the CPU (12) via PCI buses (24 and 26). The chip manager application manages access to shared computer system resources by the chips (14 and 18) so as to allow for multiple VGA-chip initialization and avoid conflicts. The invention thereby allows for use of multiple VGA devices in a PCI computer system.

5 Claims, 5 Drawing Sheets

PCI COMPUTER SYSTEM WITH MULTIPLE LEGACY DEVICES

FIELD OF THE INVENTION

The present invention relates generally to computer systems with multiple peripheral devices and, in particular, to a PCI computer system that accommodates multiple legacy devices of the same class. The invention is particularly useful for implementing multi-monitor PCI systems using multiple Video Graphics Array ("VGA") chips.

BACKGROUND OF THE INVENTION

In many applications, consumers are interested in running multiple peripheral devices of the same type or class on a computer system. For example, consumers are increasingly demanding operating systems with multiple monitors. Such multiple monitor systems achieve greater display capability without the expense or inconvenience of a single, larger monitor. Consumers have demanded multi-monitor systems in hope that they would be able to more fully exploit the abilities of improved processors and the multi-tasking efficiency of new operating systems. Additionally, multi-monitor systems allow for improved display area as desired by certain professionals such as CAD and video editing professionals, financial professionals and professionals in the controls market where multiple system components and parameters may have to be simultaneously monitored.

Implementing a multi-monitor computer system has been problematic due to preexisting industry standards developed in the single monitor display environment, in particular, the VGA display standard and the Peripheral Component Interconnect ("PCI") bus standard. Generally, a multi-monitor display system includes, inter alia, two or more monitors each driven by a graphics chip, a central processing unit ("CPU"), and a data bus for use in exchanging information between the CPU and the monitors/graphics chips. The VGA standard, which is implemented in many commercial graphics chips, was developed in the context of so-called legacy devices. Legacy devices are characterized in that they utilize their own unique resources such as memory address space, input/output ("I/O") address space, interrupt request lines and direct memory access ("DMA") channels. In this regard, VGA compatible graphics cards are mapped to predefined or dedicated resource spaces. For example, memory space may be mapped to hex addresses in the range a0000-dffff depending on the VGA mode and I/O space may be mapped to 3c0–3cf and either 3b4/3b5/3ba or 3d4/3d5/3da depending on the VGA mode. These mappings/resource usages are fixed per the VGA specification and cannot be changed. Further information relating to VGA resource usage can be obtained from T. Hogan, *The Programmer's PC Source Book* (Microsoft Press, 1988).

Most commercially available graphics chips include a VGA compliant mode of operation. Such chips persist for a number of reasons including the continuing availability and use of VGA related devices and software written with the expectation that given legacy devices will use predefined resources. The VGA chips thus provide VGA compatibility for computer boot purposes, but may also implement extended non-VGA registers for various high-end features. These chips are nonetheless VGA compatible and are considered VGA devices.

Legacy devices may be contrasted with emerging non-legacy or so-called plug and play ("PNP") devices. PNP devices are characterized by the ability to be configured so as to utilize available resources. That is, PNP devices do not require predefined, dedicated address space for various resources. PNP technology involves a hardware implementation and related software or logic support. The hardware implementation allows PNP devices to have resource settings set electronically, i.e., without user set jumpers or switches. In addition, PNP hardware devices boot (start) in an unconfigured, turned off state. PNP software or logic support involves examining the system, determining what resources are available (not in use by another device), determining what resources the PNP hardware needs by querying the PNP hardware, setting up the PNP hardware to use those available resources and then turning on the PNP hardware.

The PCI bus standard is designed to accommodate PNP devices. To that end, the PCI specification provides for software driven initialization and configuration of PNP peripheral devices such as PCI cards. Generally, under the PCI protocol, the computer Basic Input/Output System (BIOS) scans the PCI bus, when the system is first turned on, to determine what resources each PCI device needs. The BIOS then assigns non-conflicting resources to each card, turns each card on, and initializes each card that may include an initialization routine in a card BIOS (VGA devices will include such a routine). Note that this initialization procedure may be repeated at a later time, for example, when a graphical user interface (GUI) operating system boots. Further information regarding the associated resource allocation cycle of the PCI protocol can be obtained from the PCI *Local Bus Specification* (Rev. 2.1, 1995).

A problem arises when more than one legacy device of a particular type is implemented in a PCI system. The problem stems from the fact that legacy devices demand dedicated resources. Two legacy devices of the same type may therefore require access to the same memory space. Thus, upon initialization, if the system BIOS assigns the required resources to a first legacy device, the resources will be unavailable for the second legacy device. As a result, the system BIOS would be unable to turn on and initialize the second legacy device according to a conventional PCI resource allocation cycle. Software cannot use these legacy devices while they are turned off and not initialized.

Multi-monitor system suppliers have generally avoided this problem in one of two ways. First, some suppliers have only allowed for one VGA chip in the system. Any additional chips must be PNP compatible (i e., non-VGA). Accordingly, the VGA chip can access its dedicated resources and the remaining PNP chips utilize remaining available resources. Although such systems achieve certain operating efficiencies, they are not fully satisfactory for many users who wish to utilize multiple VGA devices. Other suppliers have proposed or incorporated specialized hardware into the system, i. e., on the graphics card, so as to, in effect, implement a kind of time share multiplexing of the shared resources as between the multiple VGA devices. Unfortunately, the specialized hardware adds to the complexity and expense of the system.

SUMMARY OF THE INVENTION

The present invention allows for running multiple legacy devices of the same type on a PCI computer system substantially without system errors or specialized hardware. The invention thus addresses the needs of consumers who already possess multiple legacy peripherals and desire to run them in a single system, or who otherwise desire the option of running multiple legacy devices of the same type without significant hardware upgrading. In particular, the invention advantageously allows for running multiple VGA monitors off of a PCI bus, thereby allowing PCI system users to run multiple monitors while employing conventional VGA compatible adapters.

According to one aspect of the present invention, a computer system includes a PCI compliant I/O subsystem, a first legacy device of a first type associated with the PCI compliant I/O subsystem, a second legacy device of the same first type associated with the PCI compliant I/O subsystem and a control subsystem, independent of the legacy device, for controlling operation of the first and second legacy devices such that the devices can operatively share particular resources of the computer system. Each of the legacy devices may include a VGA graphics chip or monitor. The control subsystem is preferably implemented as software for alternately providing access to the system CPU as between the respective first and second legacy devices, i.e., providing such access to each of the devices on an exclusive basis at separate times such as on an as-needed basis. By virtue of the independence of the control subsystem from the legacy device, conventional legacy devices can be run in a manner that mimics plug and play functionality, and the control subsystem can be made compatible with multiple legacy device types.

According to another aspect of the present invention, the configuration space command register of the computer system is used to dynamically reconfigure the system during operating time, i.e., during and/or after booting. The PCI definition provides a configuration address space for software driven initialization and configuration. This configuration space has 256 byes of configuration registers including MemEnable and IOEnable bits. These bits allow the memory and I/O interfaces of the device to be turned off so that the device does not respond to any memory or I/O accesses. It has been recognized that these bits can be dynamically utilized during operating time to allow access to dedicated memory and I/O address spaces by only one device at a time. The corresponding method of the present invention includes the steps of interconnecting a first legacy device to a PCI compliant computer system, interconnecting a second legacy device to the PCI compliant computer system, and using the PCI configuration space to manage access of the legacy devices to shared computer resources.

According to a further aspect of the present investigation, a method is provided for drawing on multiple VGA monitors using a PCI computer system. The method includes the steps of interconnecting first and second VGA monitors to a PCI computer system, activating a first VGA chip associated with the first monitor using PCI configuration space of the PCI computer system, operating with the computer system to draw on the first monitor, deactivating the first VGA chip associated with the first monitor, activating a second VGA chip associated with the second monitor using PCI configuration space of the PCI computer system, and operating the PCI computer system to draw on the second monitor. The chip activating and deactivating steps of this process can be implemented by using the MemEnable and IOEnable bits of the PCI configuration space. The invention allows users to achieve multi-monitor functionality in a PCI computer system while using VGA compatible monitors and display adapters.

BRIEF DESCRIPTION OF THE DRAWINGS

For a more complete understanding of the present invention and further advantages thereof, reference is now made to the following detailed description taken conjunction with the drawings in which.

DETAILED DESCRIPTION OF THE INVENTION

The following description, the invention is set forth in the context of a PCI computer system running multiple VGA graphics chips and associated monitors. However, it will be understood that various aspects of the invention are more generally applicable to running multiple legacy devices on a PCI computer system.

Figure 1:
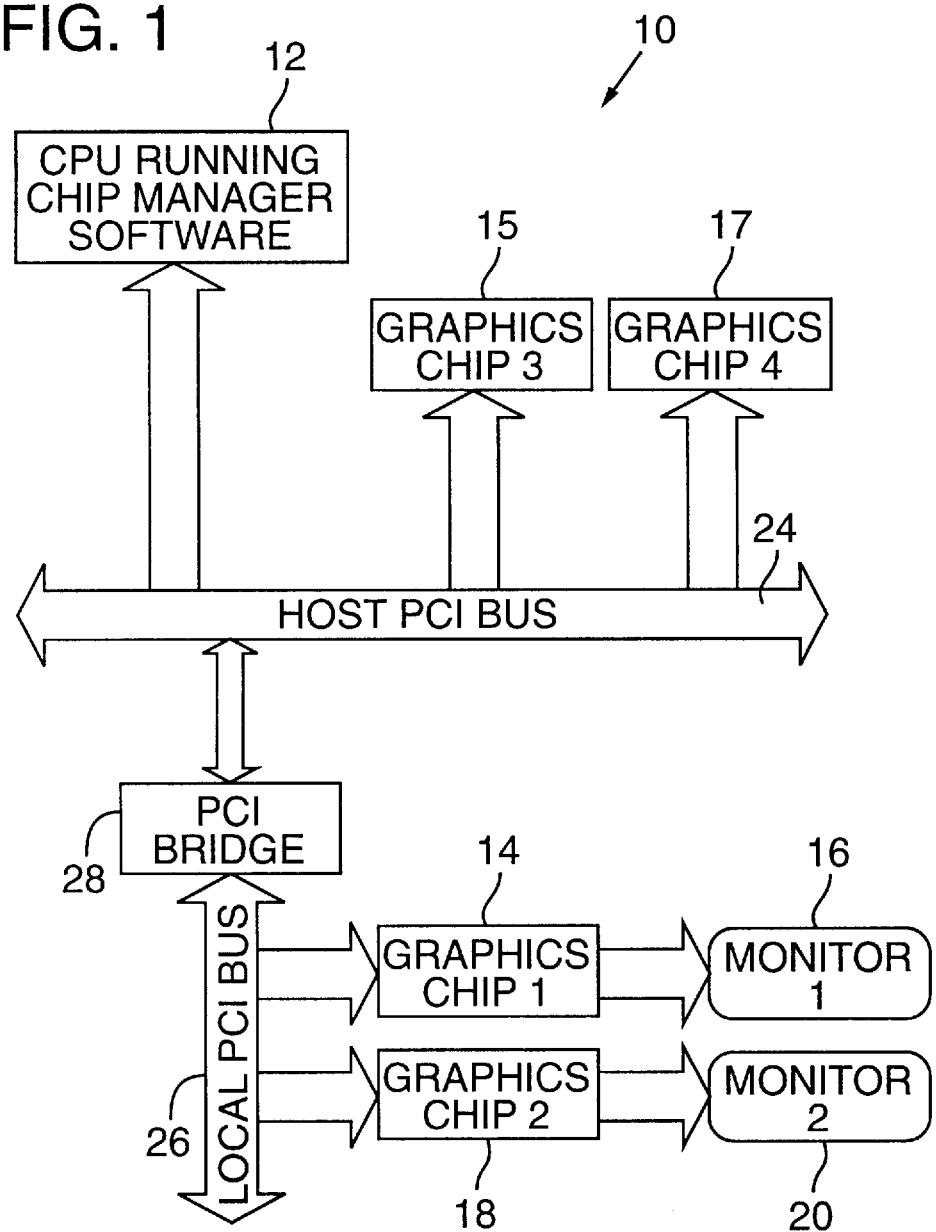
FIG. 1 is a schematic diagram of a computer system in accordance with the present invention.

Referring to FIG. 1, a computer system constructed in accordance with the present invention is generally identified by the reference numeral 10. Generally, the computer system 10 includes a host computer CPU 12, a first graphics chip 14 associated with a first monitor 16, a second graphics chip 18 associated with a second monitor 20 and a chip manager application running on the host computer CPU. The computer system 10 also incorporates an I/O subsystem including a host PCI bus 24, a local PCI bus 26 connecting the peripheral devices and a conventional PCI bridge 28 for interfacing the PCI buses 24 and 26. FIG. 1 also shows additional graphics chips 15 and 17 connected directly to the host PCI bus 24, thus illustrating alternative system architecture options.

An important objective of the PCI specification is to provide a substantially hardware independent local bus architecture that supports PNP performance. The present invention operates within this framework and it will therefore be understood that various devices and platforms can be utilized. The host computer of the illustrated embodiment includes a fully PCT compliant host bus 24 for providing access to the CPU 12. The CPU 12 may be, for example, a Pentium Processor manufactured by Intel Corporation.

The graphics chips 14 and 18 may be any of various commercially available VGA compatible chips. In this regard, it will be appreciated that the chips may include non-VGA features in addition to the VGA booting compatibility functions. Each of the illustrated chips may comprise, for example, a model No. GD5434 chip manufactured by Cirrus Logic and may incorporate its own chip BIOS as well as 2 MB of Dynamic Random Access Memory. Although the computer system 10 is thus depicted as having four chips including two identical VGA chips, it will be appreciated that more than four VGA chips or differing VGA chips may be utilized in accordance with the invention. Any compatible monitors 16 and 20 can be driven by the chips 14 and 18. The illustrated local bus 26 and bridge 28 are fully PCI compliant.

The discussion below refers to a number of functions performed by the chip manager program relating to graphics chip initialization, resource allocation, conflict avoidance and related management functions. It will be understood that such functions can be implemented in various ways. In this regard, the functions are preferably compiled and run in the computer system 10 as object code. It will thus be appreciated that the chip manager logic is physically separate from and independent of the graphics chips 14 and 18.

In order to implement its management functions, the chip manager software uses the configuration space defined by the PCI specification. PCI compliant devices include a 256 byte configuration space for the primary purpose of configuring the device, and thereby support PNP type functionality. Under the PCI specification, the configuration space is accessible at all times, not just during the system boot, and is therefore available for use by the chip manager software.

Figure 2:
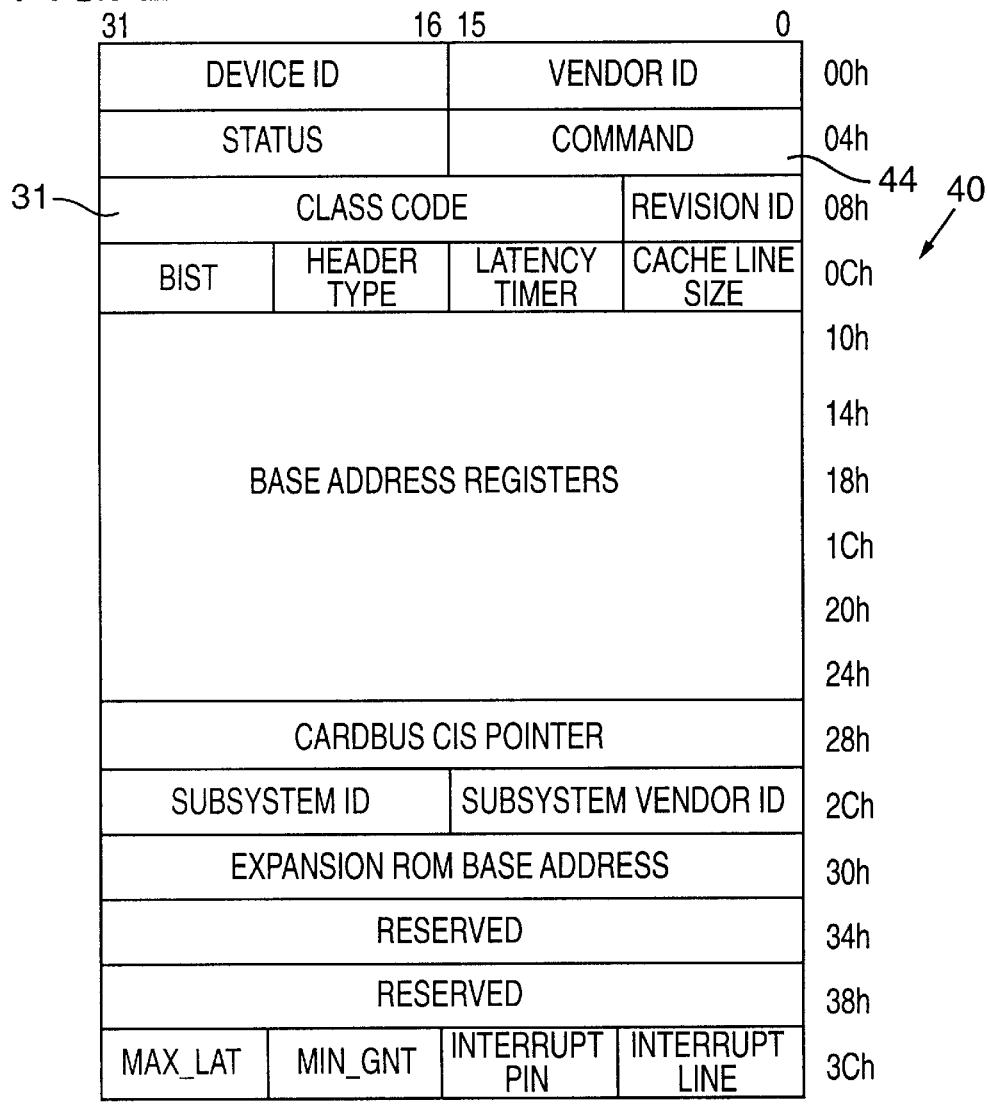
FIG. 2 illustrates the lay-out of the header portion of the configuration space as defined by the PCI specification.

The configuration space includes a predefined header and a device dependent payload section. FIG. 2 shows the layout of the predefined header 40. Generally, the header registers support a number of functions that simplify system configuration. A complete description of the various function registers depicted is included in the PCI specification and will not be set forth here. However, the class code register 42 and command register 44 are worthy of note. The class code register is a read only device used to identify the type of the device. It is broken into three byte size fields that identify, respectively, the broad class of function performed by the device, the more specific sub-class of the device function, and the register level programming interface of the device. For example, the base class encoding, 03h, identifies a display controller. As will be understood from the description below, this function register can be used by the chip manager program to identify types of graphics chips for initialization and resource allocation.

Figure 3:
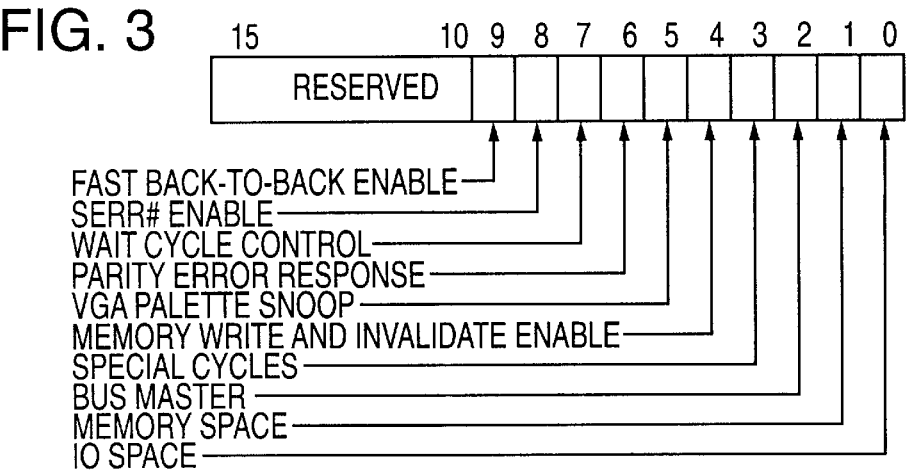
FIG. 3 illustrates the lay-out of the command register of the header of FIG. 2.

The command register 44 generally provides control over a device's response to PCI cycles. FIG. 3 shows the general layout of the command register 44. For the present purposes, bits 0 and 1 are of the greatest relevance. Bit 0 controls the device's response to I/O space accesses. Bit 1 controls the device's response to memory space accesses. In either case, a logical value of 0 disables the device response, and a logical value of 1 enables the device response. As will be understood from the description below, the chip manager dynamically controls these bit values during operating time so as to allow only one legacy device of a particular type (where the type indicates that devices of the type may share resources that are predefined by the VGA standard) to access the related resources at a given time. That is, the chip manager software uses the configuration space to swap multiple legacy devices into and out of a single, dedicated memory and I/O map substantially without using additional logic or hardware.

The chip manager generally addresses two types of problems in connection with implementing multiple VGA graphics chip control in a PCI computer system: address decoding and chip initialization. Chip initialization involves allowing the multiple VGA chips to be initialized at booting. As previously noted, conventional PCI initialization processes do not provide for initialization of multiple devices competing for the same system resources. Address decoding involves managing multiple legacy device operation to avoid conflicts resulting from shared resource spaces.

Figure 4:
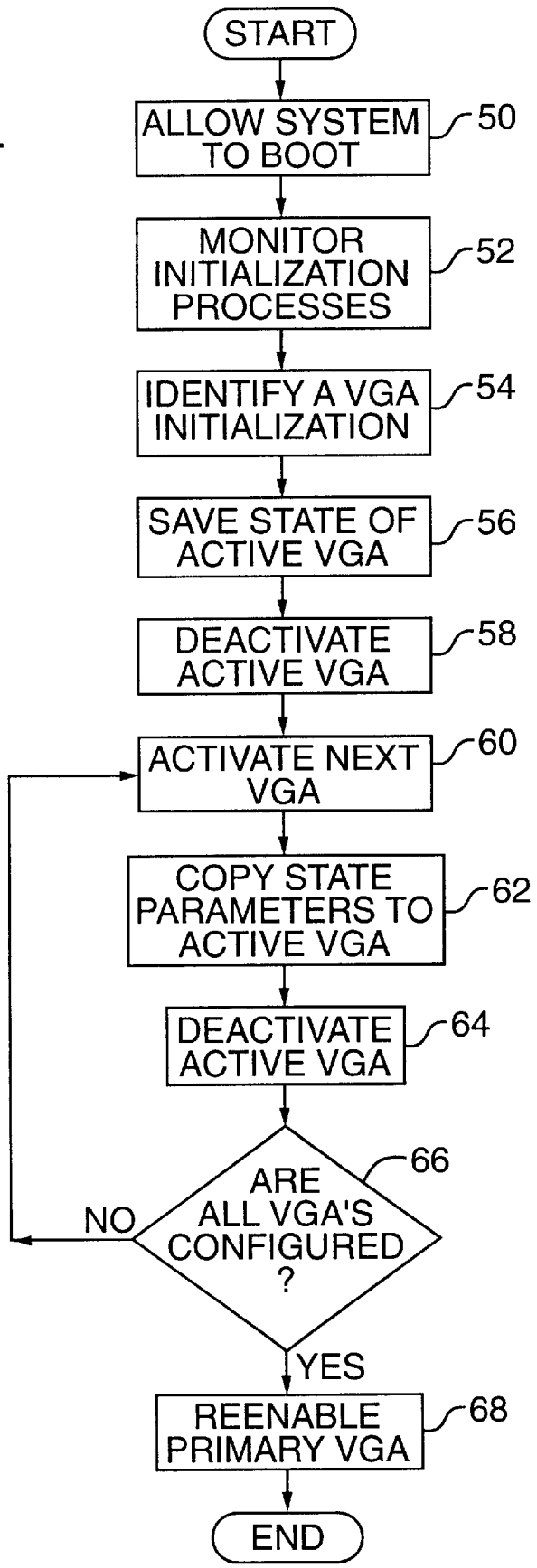
FIG. 4 is a flow diagram illustrating an initialization process in accordance with the present invention.
Figure 5:
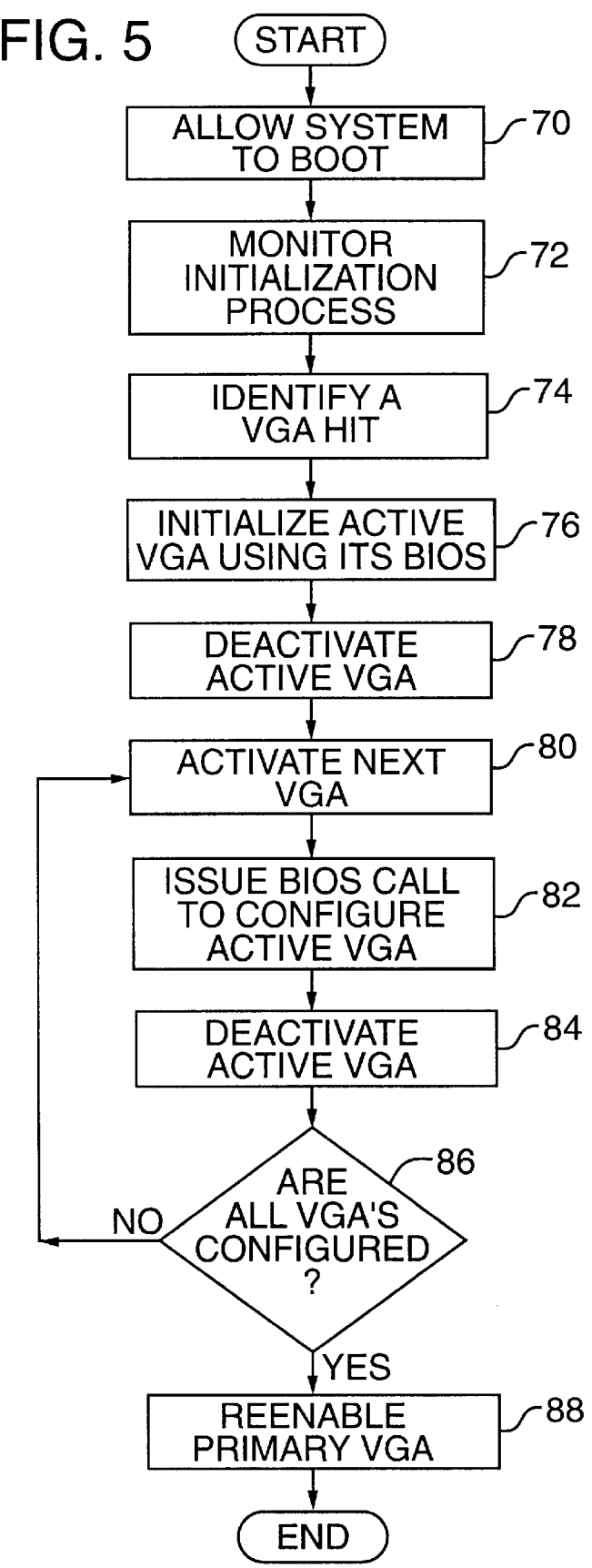
FIG. 5 is a flow diagram of an alternative initialization process in accordance with the present invention.

FIGS. 4–5 illustrate alternative initialization processes implemented by the chip manager software relating to the nature of the VGA graphics chips employed in the computer system. Referring to FIG. 4, an initialization process for use in connection with multiple, identical VGA graphics chips is illustrated. The process is initiated by allowing (50) the computer system to boot as normal and monitoring (52) the initialization process to identify (54) an initialization action for a VGA graphics chip. Such activity can be readily identified by reference to returned header class code values. The first VGA graphics chip, thus initialized, will function as the primary chip for the chip manager's purposes. Upon activation and initialization of the primary chip by the computer system, the chip manager saves (56) the state of the active VGA chip.

The chip manager then deactivates (58) the primary VGA chip and activates (60) the next VGA chip identified in the system. It will be noted that, throughout the processes described herein, the chips are managed so that: 1) two chips are not activated at one time and 2) one chip (most often the primary chip) is always active (except for short gaps relating to switching from one chip to another). Although the latter condition is not required for proper functioning, it has been found convenient to always hold one chip activated as this is what various applications or routines are programmed to expect. Once the next VGA chip is activated, the chip manager copies (62) the saved state parameters of the primary chip into the parameter field for the activated VGA chip and then deactivates (64) the active VGA chip. At this point, the chip manager determines (66) whether all of the VGA chips of the computer system have been initialized and thereby configured. If not, the chip manager activates (60) the next VGA chip. Otherwise, the VGA chip reenables (68) the primary VGA chip (so that one chip remains active) and the initialization process is complete.

Although the initialization process of FIG. 4 is suitable for systems employing multiple, identical VGA chips, a separate initialization process is used in systems where the chips are different. FIG. 5 illustrates such a process. The process is initiated by allowing (70) the system to boot and monitoring (72) the initialization process to identify (74) a VGA chip initialization as described above. Upon identifying a VGA chip initialization communication, the system initializes (76) the subject active VGA chip using the chip's BIOS initialization functions. The active VGA chip is then deactivated (78) and the next VGA chip identified in the computer system is activated (80). The chip manager then initializes and configures the active VGA chip by issuing (82) a BIOS call to the active VGA chip's BIOS. Once initialization is completed, the chip manager deactivates (84) the active VGA chip and determines (86) whether all of the VGA chips in the computer system have been configured. If not, the chip manager proceeds to activate (80) the next VGA chip identified in the computer system and the process is repeated. Otherwise, the primary VGA chip is reenabled (88).

Figure 6:
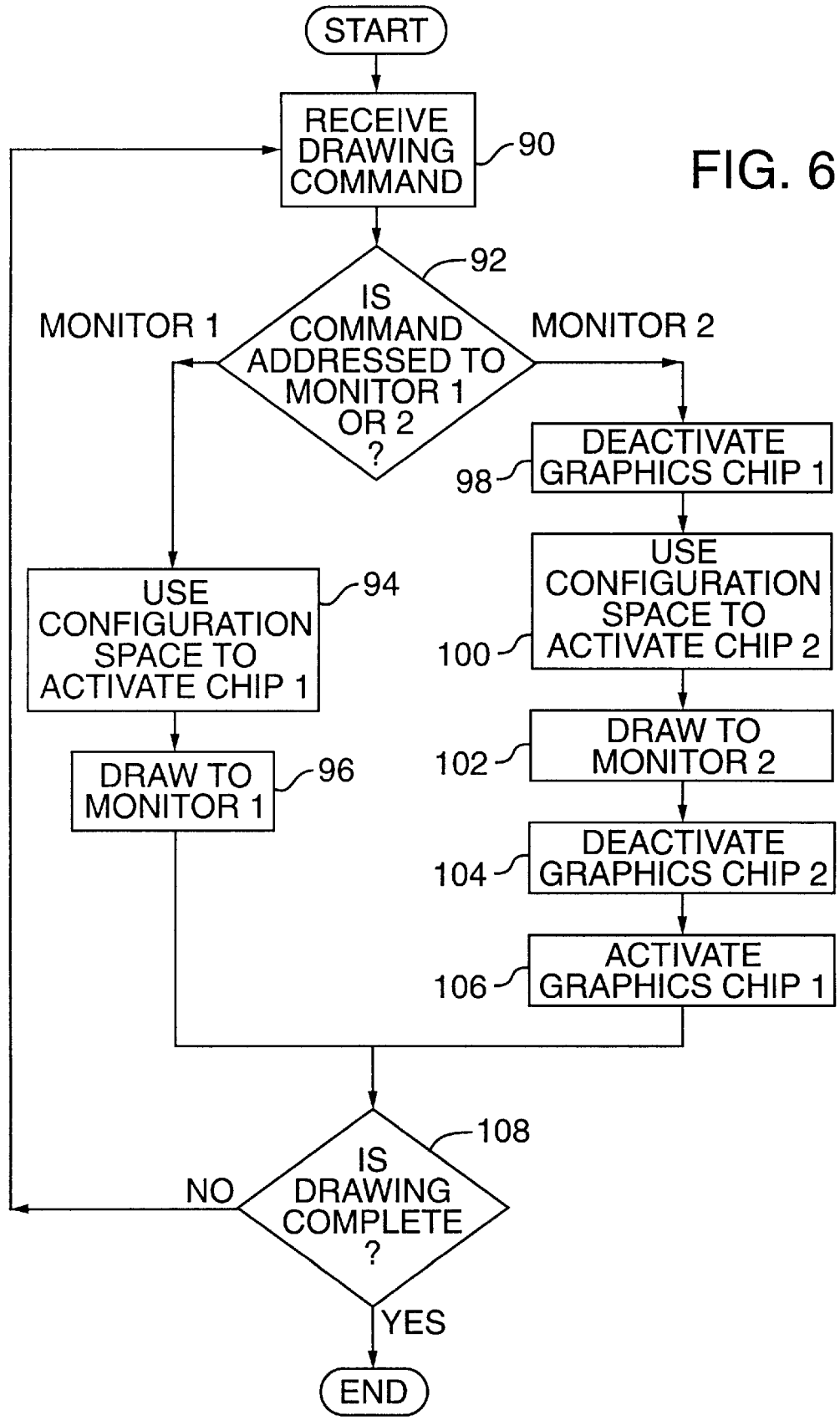
FIG. 6 is a flow diagram of a multi-monitor drawing process implemented in accordance with the present invention.

In addition to VGA device initialization, the chip manager manages various post-initialization operations so as to avoid conflicts with respect to shared computer system resources as between the multiple VGA devices. By way of illustration, FIG. 6 shows a process for managing multiple (in this case, two) VGA graphics chips to draw on multiple monitors. The operation is initiated by receiving a drawing command, for example, in a GUI operating system environment. Upon receiving the command, the chip manager determines (92) whether the command is addressed to monitor/graphics chip 1 or monitor/graphics chip 2. In this case, graphics chip 1 is taken to be the primary graphics chip as determined during initialization. If the command is addressed to monitor 1, the chip manager uses (94) the configuration space of graphics chip 1 to activate the chip if the chip is not already activated. It shall be noted that the primary chip will typically be activated at this point in the illustrated system. As previously noted, the configuration space includes bits for enabling I/O and memory space access. Once the graphics chip has been activated, the computer system operates in normal fashion to draw (96) to monitor 1. The chip manager continues to monitor the drawing throughout the process to determine (108) whether the drawing is complete. In this regard, the chip manager will either receive (90) additional drawing commands, or will eventually intercept a message indicating that drawing is complete, thereby ending the operation. If a drawing command is addressed to a nonprimary monitor, i.e., monitor 2, the chip manager deactivates (98) the primary chip, i.e., chip 1, and then uses (100) the configuration space of graphics chip 2 to activate the chip as discussed above. The computer system then proceeds to draw (102) to monitor 2. Once the drawing command has been processed, the chip manager deactivates (104) graphics chip 2 and reenables (106) primary chip 1. The chip manager then continues to monitor drawing commands until the drawing operation is complete.

While various embodiments or implementations of the present invention have been described in detail, it is apparent that further modifications and adaptations of the invention will occur to those skilled in the art. However, it is to be expressly understood that such modifications and adaptations are within the spirit and scope of the present invention.

I claim:

1. A computer system, comprising:

a PCI compliant I/O subsystem;

a first legacy device of a first type associated with the PCI compliant I/O subsystem, when in an active state the first legacy device utilizing a particular resource of the computer system;

a second legacy device of the same first type associated with the PCI compliant I/O subsystem, when in an active state the second legacy device also utilizing the particular resource of the computer system; and a configuration control subsystem, independent of the first and second legacy devices, for controlling operation of the first and second legacy devices such that the devices can operatively share the particular resource of the computer system.

2. A method for drawing in a multiple VGA monitor, PCI computer system, comprising the steps of:

interconnecting first and second VGA monitors to the PCI computer system;

activating a first VGA chip associated with the first monitor using PCI configuration space of the PCI computer system, the first VGA chip utilizing a particular resource of the PCI computer system;

operating the PCI computer system to draw on the first monitor;

deactivating the first VGA chip associated with the first monitor;

activating a second VGA chip associated with the second monitor, using PCI configuration space of the PCI computer system, the second VGA chip also utilizing the particular resource of the PCI computer system; and operating the PCI computer system to draw on the second monitor.

3. The computer system of claim 1 in which the first and second legacy devices are first and second VGA chips driving respective first and second VGA monitors.

4. The computer system of claim 1 in which the particular resource includes at least one of a memory address space, an I/O address space, an interrupt request line, and a DMA channel.

5. The method of claim 2 in which the particular resource includes at least one of a memory address space, an I/O address space, an interrupt request line, and a DMA channel.

* * * * *